United States Patent [19]

Pellegrin et al.

[11] 4,436,541
[45] Mar. 13, 1984

[54] METHOD FOR PRODUCTION OF MINERAL FIBERS

[75] Inventors: Michael T. Pellegrin; Terry J. Hanna, both of Newark; Thomas K. Thompson, Granville, all of Ohio

[73] Assignee: Owens-Corning Fiberglas Corporation, Toledo, Ohio

[21] Appl. No.: 340,177

[22] Filed: Jan. 18, 1982

Related U.S. Application Data

[63] Continuation of Ser. No. 141,872, Apr. 21, 1980, abandoned.

[51] Int. Cl.³ .......................................... C03B 37/085
[52] U.S. Cl. ................................. 65/2; 65/1; 65/12; 65/346
[58] Field of Search ............................. 65/1, 2, 12, 346

[56] References Cited

U.S. PATENT DOCUMENTS

| | | |
|---|---|---|
| Re. 21,863 | 7/1941 | Slayter . |
| 2,189,822 | 2/1940 | Thomas et al. . |
| 2,212,528 | 8/1940 | Slayter . |
| 2,257,767 | 10/1941 | Slayter et al. . |
| 2,577,213 | 12/1951 | Slayter et al. ............... 259/17 |
| 2,947,027 | 8/1960 | Slayter . |
| 3,187,076 | 6/1965 | Machlan et al. . |
| 3,328,144 | 6/1967 | Glaser ............................. 65/11 |
| 3,390,972 | 7/1968 | Froberg .......................... 65/1 |
| 3,401,536 | 9/1968 | Glaser ............................. 65/1 |
| 3,416,906 | 12/1968 | Glaser ............................. 65/1 |
| 3,492,104 | 1/1970 | Glaser ........................... 65/11 |
| 3,556,753 | 1/1971 | Glaser ............................. 65/2 |
| 3,837,823 | 9/1974 | Shealy ............................ 65/1 |
| 3,840,358 | 10/1974 | Whitfield ....................... 65/1 |
| 3,920,429 | 11/1975 | Stalego .......................... 65/1 |
| 3,926,600 | 12/1975 | Stalego .......................... 65/1 |
| 3,988,135 | 10/1976 | Coggin ........................... 65/1 |
| 4,026,689 | 5/1977 | Higginbotham ............... 65/1 |
| 4,046,535 | 9/1977 | Stalego .......................... 65/1 |
| 4,155,732 | 5/1979 | Schlachter et al. ............ 65/1 |

*Primary Examiner*—Robert L. Lindsay, Jr.

[57] ABSTRACT

The present invention embraces apparatus for the production of mineral fibers. A bushing for the manufacture of mineral fibers, such as glass fibers, comprises an orificed bottom wall for the passage of streams of molten mineral material therethrough for attenuation into fibers, upwardly extending sidewalls and an orificed member, positioned above the bottom wall and extending between the sidewells, for passage of the molten mineral material therethrough to the bottom wall. The ratio of the poiseuille resistance to flow of the orificed member to the poiseuille resistance to flow of the bottom wall is in the range of from about 0.5 to about 1.0.

1 Claim, 5 Drawing Figures

METHOD FOR PRODUCTION OF MINERAL FIBERS

This is a continuation of application Ser. No. 141,872, filed Apr. 21, 1980 now abandoned.

TECHNICAL FIELD

The invention relates to method and apparatus for producing fibers from heat softened mineral material, such as glass. More specifically, this invention relates to an improved bushing or stream feeder construction.

BACKGROUND ART

It has been conventional practice to produce mineral fibers, and particularly glass fibers, through electrically heated bushings. An electrically heated screen is positioned in the bushing for the flow of mineral material therethrough. Such conventional heater screens are used to thermally condition the material as it passes through the bushing. Such heater screens are conventionally very porous and are not used to regulate flow of a glass in the bushing. The ratio of the resistance to flow of the heater screen to the resistance to flow of the orificed bushing bottom wall is from about 0.05 to about 0.09.

In conventional bushings, the flow through the bushing is generally controlled by the orifices in the bottom wall. The throughput of the bushing is greatly affected and can be disrupted by fluctuations of power to the bottom wall of the bushing, thermal transients in the glass from the glass supply, and thermal transients from the environment beneath the bushing. Improved bushing design is desired for more positive control over bushing throughput.

SUMMARY OF THE INVENTION

The present invention comprises a bushing for the manufacture of mineral fibers comprising an orificed bottom wall for the passage of streams of molten mineral material therethrough for attenuation into fibers, upwardly extending sidewalls, and an orifice member, positioned above the bottom wall and extending between the sidewalls, for the passage of the molten mineral material therethrough to the bottom wall. The ratio of the resistance to flow of the orificed member to the resistance to flow of the bottom wall is in the prefered range of from about 0.5 to about 1.

An object of the invention is an improved apparatus for the production of mineral fibers.

Another object of the invention is to provide an improved bushing for use in the manufacture of mineral fibers, such as glass fibers.

These and other objects of the invention will become more apparent as the invention is described hereinafter in detail with reference to the accompanying drawings.

DESCRIPTION OF THE PREFERRED EMBODIMENTS

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the pharaseology employed herein is for the purpose of description and not of limitation.

While the appararus of the invention has particular utility in the processing of glass for forming fibers or filaments, it is to be understood that the apparatus may be employed for producing fibers from other materials.

Figure 1:
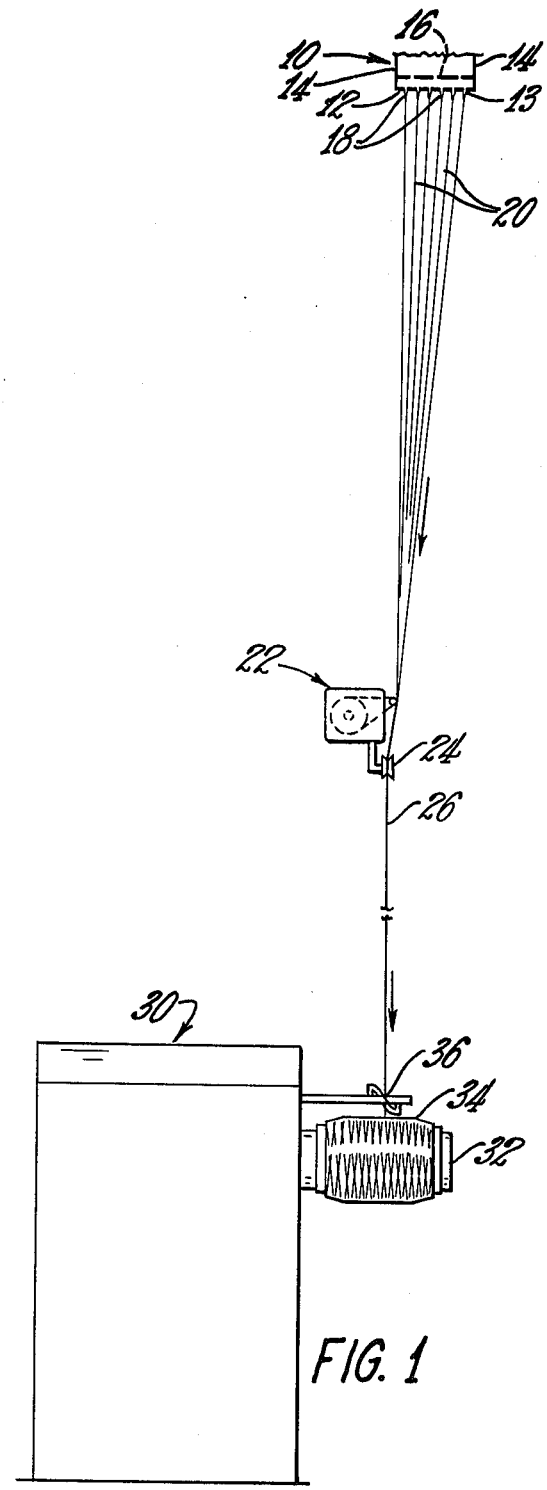
FIG. 1 is a semi-schematic elevational view of a fiber-forming apparatus embodying the invention.

Referring to the drawings in detail, FIG. 1 illustrates a fiber-forming operation. Mineral material, such as glass, is maintained in a molten condition in bushing or stream feeder assembly 10 from which a plurality of streams of material is emitted from orificed tips or projections depending from the bushing floor. Bushings which do not have tips but have an orificed bottom wall can also be used.

The streams of glass form cones 18 at the discharge end of the orificed projections. Glass fibers 20 are attenuated from the cones of molten glass. The fibers are coated by size applicator 22 and gathered into strand 26 by gathering shoe 24. The strand is then collected by winder assembly 30. The strand is reciprocated by traverse 36 for collection into package 34 on winder collet 32. Conventional glass fiber-forming environmental control means (not shown) control the environment beneath the bottom wall of the bushing.

Figure 2:
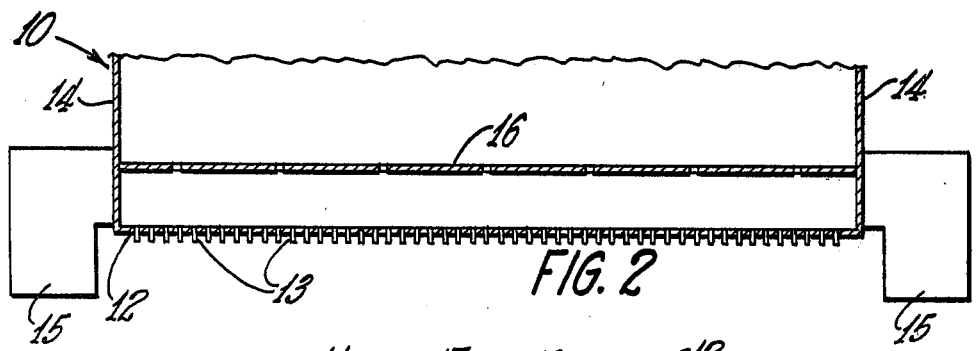
FIG. 2 is a sectional side view of the bushing assembly of the invention.
Figure 3:
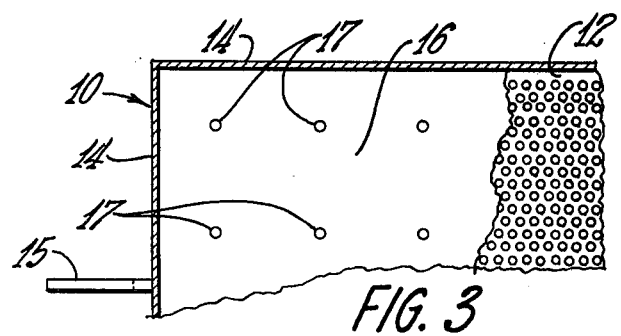
FIG. 3 is a partial, sectional top view of the bushing assembly of FIG. 2.

The bushing assembly of FIG. 1 is shown in greater detail in FIGS. 2 and 3. The bushing chamber comprises bottom wall 12 with tips 13, upwardly extending sidewalls 14 with conventional electrical terminals extending from two opposite sidewalls and orificed member or screen 16.

Glass fiber-forming bushings are conventionally electrically heated and are constructed of an electrically conductive material such as a platinum/rhodium alloy. In the construction shown in FIGS. 2 and 3, orificed member 16 is connected to the sidewalls such that a portion of the electrical current flowing through electrical terminals or ears 15 passes through the member. The orificed member is positioned above the bottom wall and extends between the sidewalls. Molten glass from the supply passes through the orificed member on its way to the bushing bottom wall for exit therefrom. In this construction there are fewer holes 17 in the member than there are tips in the bottom wall.

A conventional heater screen can have 0.055 inch diameter holes in the 0.015 inch plate with a density of 100 holes per square inch. With such a screen the resistance to flow of the screen to the resistance to flow of the bottom wall can be about 0.05.

In one example of the present invention, a 0.02 inch thick orifice member was used which had 0.039 inch diameter holes on 0.25 inch centers. With such a construction, the resistance to flow of the orificed member to the resistance to flow of the bottom wall was in the range of from about 0.8 to about 0.95 depending upon the amount of heating current supplied to the bushing. It is believed that the preferred ratio range is from about 0.5 to about 1.

The high flow resistance screen concept provides for more positive control over bushing throughput. By decreasing the volume of glass affected by bushing power changes, a situation realized by thermally and fluid-mechanically isolating tip section glass from the forehearth glass or glass supply, greater control over throughput is obtained. An analagous situation in electrical circuits is the insertion of a buffer circuit (e.g., a large resistor), between two circuits having mismatched input and output impedances. In the case of a bushing, the buffer is obtained by significantly increasing the flow resistance of the screen relative to the flow resistance due to the tip plate.

In a conventional glass fiber-forming operation, pressure on the bottom wall is produced by the glass head above the bottom wall. By use of the high flow resistance orificed member in the bushing construction, about 30% to about 50% of the head pressure is lost by passage of the material through the orificed member. Thus, the effective head pressure at the bottom wall is reduced. This reduction in pressure on the bottom wall will retard the tendency of a bushing bottom wall to sag during its use.

Figure 4:
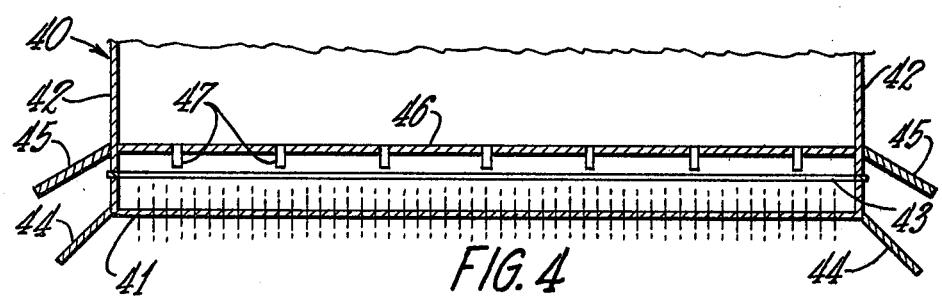
FIG. 4 is a sectional view of another bushing construction of the invention.

FIG. 4 shows another embodiment of the invention. Bushing assembly 40 comprises a tipless bottom wall 41 and upwardly extending sidewalls 42. Gasket 43 electrically isolates the upper portion of the sidewalls from the lower portions of the sidewalls. Electrical terminals 44 supply current to electrically heat the lower portion of the bushing assembly and electrical terminals 45 supply current to electrically heat the upper portion of the bushing assembly. The orificed member 46 is connected to the upper portions of the sidewalls such that a portion of the electrical current from terminals 45 passes through the orificed member. Orificed member 46 is provided with tubes or tips 47 to control the resistance to flow of the member.

Figure 5:
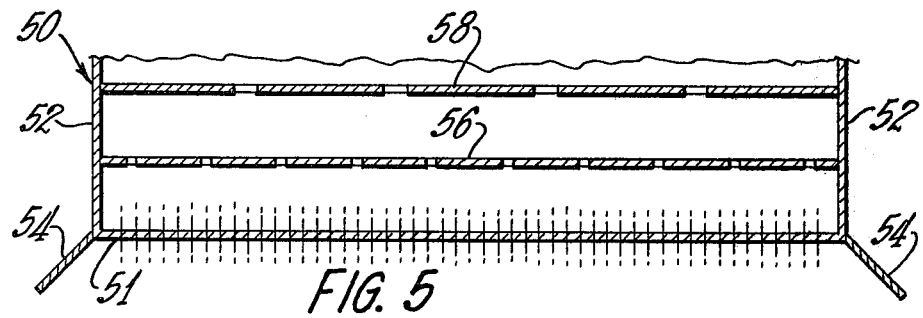
FIG. 5 is a sectional side view of another bushing construction of the invention.

FIG. 5 shows another embodiment of the invention. The bushing assembly 50 comprises tipless bottom wall 51, upwardly extending sidewalls 52 and electrical terminals 54. This bushing is provided with two orificed members or screens which are connected to the bushing for electrical flow therethrough. As can be seen, orificed member 56 is positioned above and in parallel relationship to the bottom wall and orificed member 58 is positioned above and in parallel relationship to orificed member 56. The orifices are larger and fewer in number in member 58 than in member 56.

By using multiple orificed members as in FIG. 5, the effective head pressure on the bottom wall can be reduced in steps. The glass material flowing from the supply is isolated in stages or steps from the bottom wall. In such a multi-membered construction, the ratio of the resistance to flow of the combined members to the resistance to flow of the bottom wall is in the range of from about 0.5 to about 1.

The advantageous features of the invention will be more fully understood from the following example which compares a conventional bushing to a bushing in accordance with the invention.

EXAMPLE

Two bushings, each having 816 orifices, were constructed. A conventional bushing having a resistance ratio of 0.09 (screen to plate). A bushing having a resistance ratio of 0.8–0.95 (screen to plate), but otherwise identical in construction to the first bushing. Both bushings were operated at a throughput of 25 pounds per hour.

The modified bushing exhibited several notable performance characteristics.

The tip plate temperature of the modified bushing was 80° F. hotter than the tip plate temperature of the conventional bushing, when both bushings were operated at a throughput of 25 pounds per hour. The higher tip plate temperature means that the viscosity of molten glass exiting the tips is lower, and therefore the tension in the forming cone is lower.

After a process interruption, bead fall time for the modified bushing was two-thirds of the bead fall time for the conventional bushing. Lower bead fall time means that the time required to restart the process after an interruption will be lower. Operating efficiency, i.e. the fraction of time that the bushing is actually fiberizing, will improve.

The change in throughput with a change in tip plate temperature was 13% less with the modified bushing than with the conventional bushing. This means that the dependence of throughput on bushing power fluctuations is lower for the modified bushing. It is expected that improved process stability will result.

The bushing screen for the modified bushing operated at a temperature 150° F. higher than the screen in the conventional bushing, when both bushings were operated at a throughput of 25 pounds per hour. This means that the glass in the well above the bushing will be better conditioned with the modified bushing, since 28% more heat is supplied to glass above the bushing.

Having described the invention in detail, it will be understood that such specifications are given for the sake of explanation. Various modifications and substitutions other than those cited may be made without departing from the scope of the invention as described in the following claims.

INDUSTRIAL APPLICABILITY

The present invention would be useful in the mineral fiber-forming art and, in particular, in the glass fiber-forming art.

We claim:

1. In a method of making glass fibers from a body of molten glass confined in a bushing, the steps of:
    (a) flowing molten glass from the body through an orifice plate having a plurality of orifices;
    (b) attenuating a fiber at each of said orifices;
    (c) interposing a flow resistance in the path of flow of said molten glass to said plate, the ratio of resistance of flow of the molten glass through the resistance to the resistance of flow of molten glass through said plate being from about 0.5 to about 1.0; and
    (d) heating the molten glass between said resistance and said plate by current supplied to both the resistance and the orifice plate;

the performance of steps (c) and (d) reducing the pressure of the molten glass at the plate by a factor of from 30 to 50% of the head pressure of the molten glass body above the plate and decreasing the bead fall time from an orifice at which fiber attenuation has been interrupted.

* * * * *